Nov. 13, 1951 L. HÖGEL ET AL 2,574,564
APPARATUS FOR PARTIAL SURFACE HARDENING OF
CRANKSHAFTS, CAMSHAFTS OR LIKE WORK PIECES
Filed Nov. 12, 1948 2 SHEETS—SHEET 1
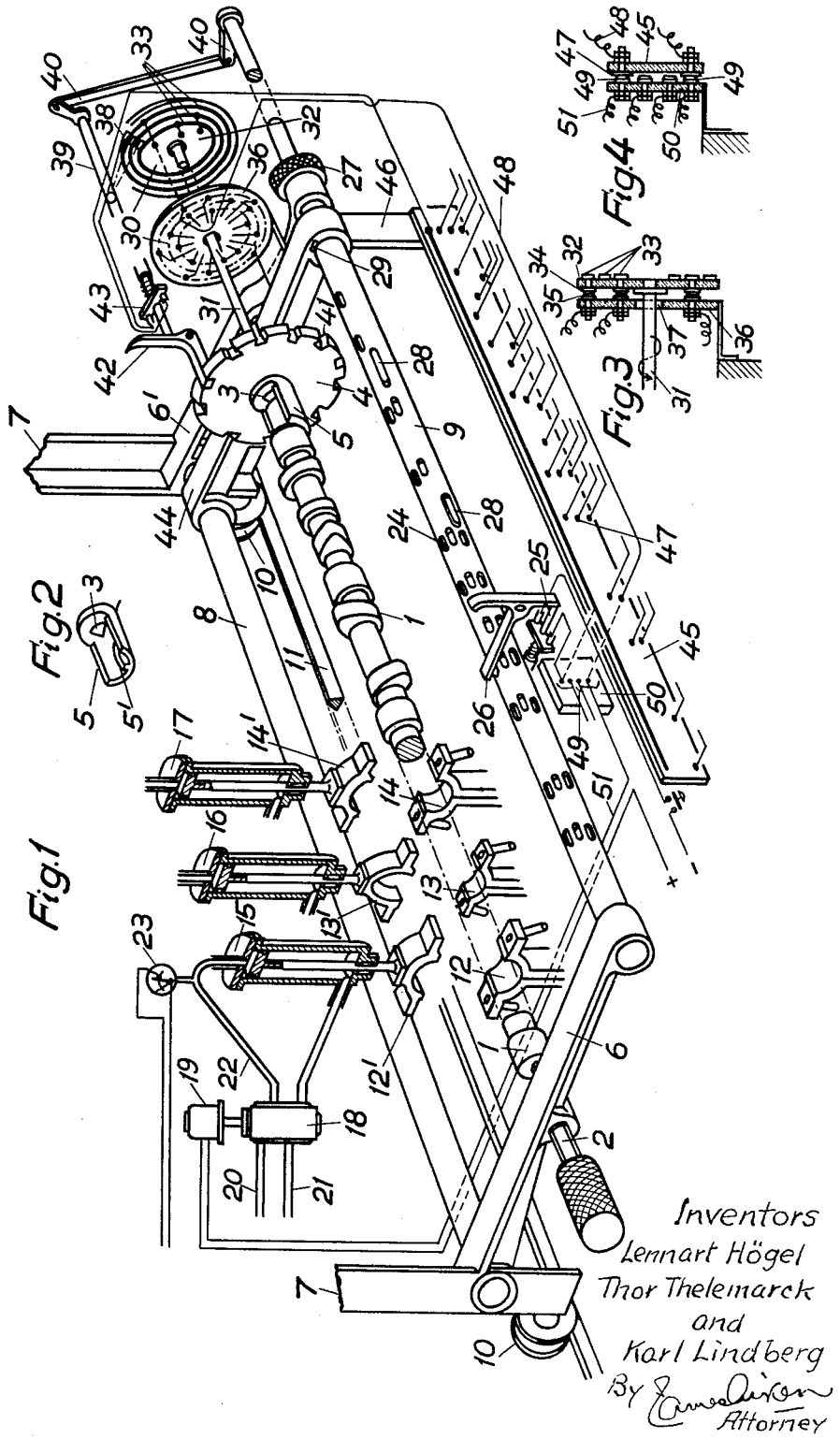
Inventors
Lennart Högel
Thor Thelemarck
and
Karl Lindberg
By
Attorney

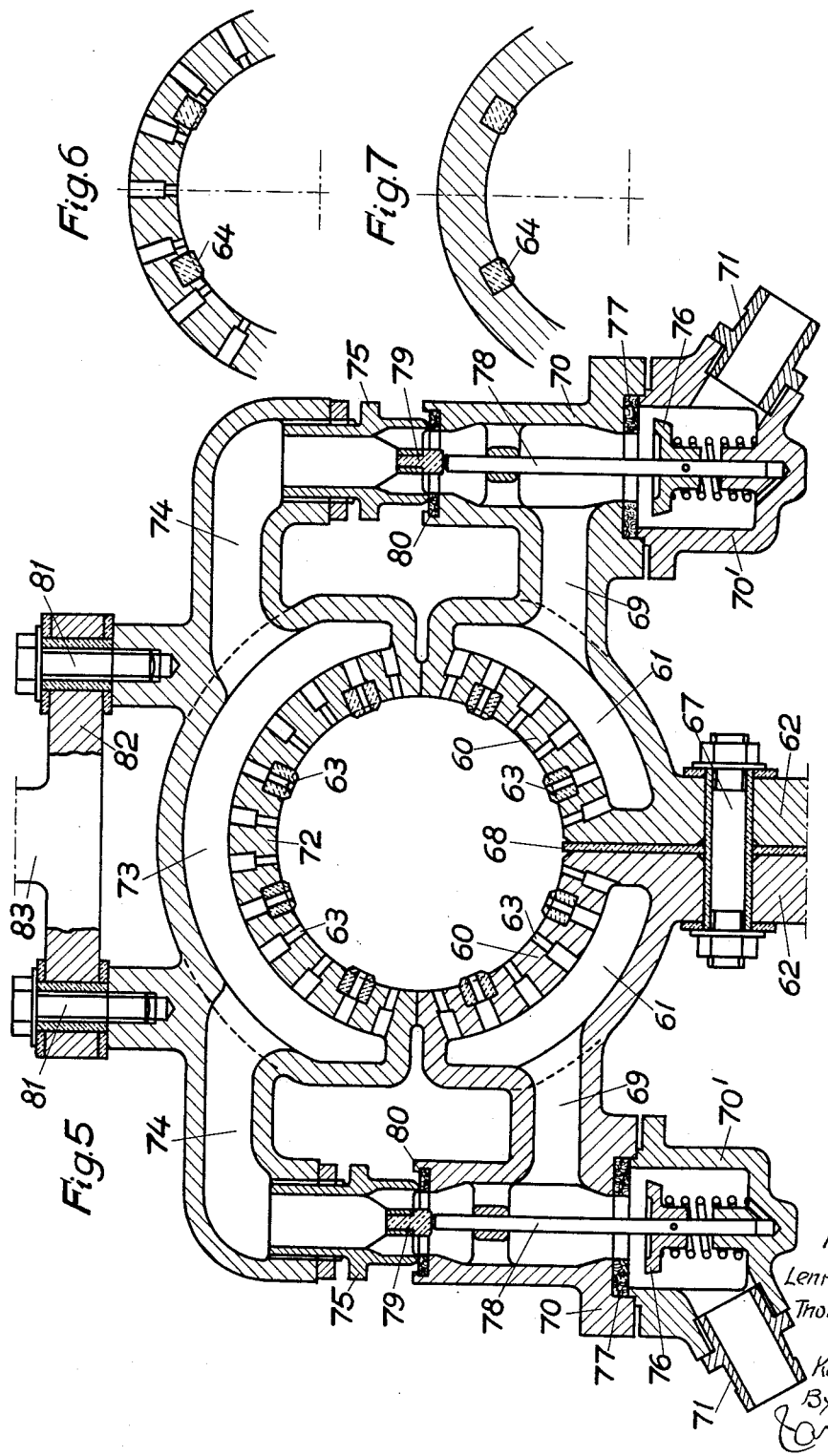

Patented Nov. 13, 1951

2,574,564

UNITED STATES PATENT OFFICE 2,574,564

APPARATUS FOR PARTIAL SURFACE HARDENING OF CRANKSHAFTS, CAMSHAFTS, OR LIKE WORKPIECES

Lennart Högel, Thor Thelemarck, and Carl Lindberg, Vasteras, Sweden, assignors to Allmanna Svenska Elektriska Aktiebolaget, Vasteras, Sweden, a Swedish corporation Application November 12, 1948, Serial No. 59,622
In Sweden November 14, 1947

7 Claims. (Cl. 266—4)

The present invention relates to improvements in apparatus for the surface hardening or other heat treatment of a plurality of parts of at least two different shapes on longitudinally extending work pieces e. g. crankshafts or camshafts by means of electric high-frequency current. The warming is accomplished in a manner known per se by placing such part of the work piece, which may be hardened, within a loop of an electric conductor, passed by a high-frequency current, said loop suitably consisting of a copper pipe in order to permit cooling. Such apparatus are known herebefore, wherein for each portion to be hardened a particular current loop was provided and the work piece successively was guided to the particular current loops and there fixed in proper position by aid of fixing means, stationary in relation to the current loop.

The present invention relates likewise to a tool for successive hardening of a plurality of parts of a longitudinally extending work piece, those parts differing in shape and size. The invention as compared with means of such kind known herebefore is characterized especially by the provision of a particular holder, which is movable in respect to the current loops and into which the work piece is fixed, whereby the holder eventually automatically is moved in the longitudinal direction of the work piece so that the different portions to be hardened will be brought into proper position in relation to the different current loops. With respect to the consumption of power and to the deformation of the work piece due to the warming process it may be advisable to heat only one portion at a time although in many cases it also may be convenient to heat a number of portions simultaneously. By using the apparatus according to the invention firstly the advantage is obtained that the different current loops which correspond to different shapes of the hardened portions may be arranged close together at a distance independent of the distance between the portions to be hardened, and further that the same holder by means of simple arrangements may be used for adjustment of work pieces with extremely different shapes and sizes.

Furthermore, according to the present invention the current loops are made dividable, one of the parts, suitably the upper part being provided with a means by which it may be opened and closed again, thereby enabling a longitudinal shifting of the work piece although the current loop is arranged in such a manner that it in closed condition closely surrounds such portion to be hardened. As the apparatus is primarily used for hardening, the current loops are made from copper-pipe; on the inside of the loop a plurality of fine perforations is made in order to obtain after the warming by the electric current is sudden quenching by supplying to the loop a quenching medium which is sprayed out through said perforations against the work piece.

The shifting of the work piece so as to enable the different portions thereof to be brought successively into register with the proper current loop and also the rotation of the work piece into proper angular position relatively to the corresponding current loop, the closing and the opening of the current through the current loop and the closing of the valves for supplying the quenching medium, are controlled by devices mounted on the holder, which devices operate controlling circuits so that the afore mentioned operations occur in proper succession, timing devices also being provided which determine the duration of the different operations.

The invention will better be understood with reference to the following drawings, wherein:

Fig. 1 diagrammatically shows a perspective view of the apparatus,

Fig. 2 shows a detail perspective view of the fastening of the work piece within its holder, Figs. 3 and 4 are cross-sections showing details of the contacting means for the controlling circuits, Fig. 5 shows in section the current loop itself and Figs. 6 and 7 show details of the current loop.

Referring to Fig. 1 the work piece, which in the example disclosed is a camshaft, is designated by 1. This shaft is fixed between two centers 2 and 3 on a holder made as a carriage comprising a framework, formed by two cross arms 6 and $6^1$, held together by two rods 8 and 9 and running on four wheels 10 on parallel guide rails 11, only two of these wheels and one rail being shown on the drawing while the two other wheels are mounted at the upper end (not shown) of vertical struts 7, which wheels run on a rail that is not shown but is horizontally disposed over the rail 11. In order to facilitate the chucking of the work piece between the centres, the centre 3 (Fig. 2) is surrounded by a half-cylindrical sleeve 5 within which the shaft rests before the centre 3 is pushed into the centre bore of the shaft. Within the sleeve 5 a Woodruff-wedge $5^1$ is mounted, and is adapted to fall into the groove usually made in the end of the shaft, whereby the shaft is fixed with respect to an adjustment disk 4 associated with the centre 3 and journalled within a bridge 44, slidable on the rods 8 and 9.

In Fig. 1 of the drawing the shaft 1 is shown partly broken away in order to prevent the concealing of the current loops, which are assumed to be three corresponding to three different forms of the portions of the shaft to be hardened. The current loops are designated by 12, 13, and 14, the upper parts of which being designated by $12^1$, $13^1$ and $14^1$. The lower parts each consist of two electrically insulated members, which are illustrated more clearly in Fig. 5, and the upper parts consist of integrally formed cover members, connected with devices by which they may be raised and lowered against the lower parts. Said devices consist of pistons movable within cylinders 15, 16 and 17, the pistons being connected by means of piston rods with the cover members. The upward and downward movements of the pistons are performed by means of a pressure fluid such as oil, which is supplied to the lower or upper side of the piston through a steering valve 18, controlled by an electromagnet 19. The oil is supplied and carried off through pipelines 20 and 21. At the inlet 22 to the upper side of the piston there is arranged a contact manometer 23 the purpose of which is to block the electrical controlling circuits until the pressure in the line 22 has reached such a value that sufficient contact pressure is obtained between the upper and the lower parts of the current loop. The steering valve with its magnet and the contact manometer have been shown on the drawing only for one of the cylinders. In reality each of the cylinders is provided with a steering valve with associated control magnet. However, the contact manometer may be common to all of the steering cylinders.

The three loops 12, 13 and 14 have three different shapes, corresponding to three different shapes of the portions to be hardened, and the loops 12 and 14 may be assumed to be round corresponding to axle journals with different diameters of the shaft, while the current loop 13 is formed according to the cams on the cam shaft. In the case that the portions to be hardened have more than three different shapes it is evident that more current loops must be provided.

The rod 9 within the holder for the work piece serves as a pattern member for controlling the supply of current to the inductors when it has caused the parts to be treated to be successively properly positioned with respect to said inductors, and for that purpose, the said pattern member or rod 9 is provided with a plurality of rows of holes 24, each row corresponding to a predetermined work piece and to the distance between the portions to be hardened. These holes 24 are arranged to cooperate with a switch 25, the pawl 26 of which falls into the holes 24, thereby closing the contacts on the switch 25. By the rotation of the pattern rod 9 the pawl 26 may be caused to cooperate with any one of the rows of holes. The rotation of the rod 9 is performed by means of a pulley 27. In reality each row of holes on the rod 9 is made according to a certain length of the work piece. For the clamping of work pieces of different lengths the bridge 44 will be moved upon the rods 8 and 9 and in order that the bridge 44 may be displaced to the distance between centres required, the wedges 28 also may be capable of engaging the key groove 29 on the bridge 44. Thus for a given work piece the rod 9 takes up the proper position so that the proper row of holes 24 are effective.

However, it is not sufficient that the shaft be fixed in longitudinal direction by means of the holes 24 but it is also necessary that the shaft may be rotated to a proper position with respect to the need for the cam of being brought in proper position relative to the corresponding current loop. This rotation is effected by the adjustment disk 4 and the contact means 30. This contact means 30 is shown in Fig. 1 as comprising two disks separated from each other. In reality the contact means is made as shown in the Fig. 3. It comprises a disk fixed on the shaft 31, which disk on the side facing away from the shaft 1 has a number of slip rings 33 corresponding to the number of rows of holes on the rod 9. These slip rings are connected by bolts passing through the disk 32 with contact buttons 34 on the sides facing to the adjustment disk 4. Upon rotation of the disk 32 the contact buttons 34 will be brought into engagement with contact buttons 35, arranged on a stationary disk 36 in which there is a hole 37 through which the shaft 31 extends to the disk 32.

The slip rings 33 are engaged by a slip contact 38, attached to shaft 39, which by means of a link mechanism 40 is moved upon the rotation of the pattern rod 9 from the one slip ring 33 to the other, causing the slip contact 38 to come into engagement with a slip ring 33 corresponding to a certain row of holes 24.

The adjustment disk 4 is provided with a number of recesses 41 into which a pawl 42 may fall causing the closing of the switch 43.

Attached to the bridge 44 by means of a bar 46 is a plate 45. The contacts 47 fixed on this plate are connected through conductors 48 to the contacts 35 on the disk 36. The contacts 47 are arranged in rows, corresponding to the contacts 49 on the stationary contact plate 50, the contact 47 extending through the contact plate 45 and being arranged on the side facing to the plate 50 so that they will be brought into engagement with the contacts 49. This arrangement is shown in detail in Fig. 4. Through the conductors 51 the contacts 49 are in connection with the different means to be controlled and which have not been shown on the drawings.

The principle for the control of the circuits consists in that the circuits necessary for each operation first may be accomplished as the contacts 47 for each position of the shaft engage the contacts 49 and simultaneously the contacts 34 engage the contacts 35; but in order to obtain on one hand mechanically proper adjustment of the shaft it is also necessary for the pawls 26 and 42 to fall into the appropriate holes 24 and recesses 41 respectively, a correct closing of the different circuits thus being obtained in that these pawls will operate switches 25 and 43 so that the circuits can not be closed before these pawls will have fallen into associated holes or recesses.

In the drawings Fig. 5 shows the current loops in section with valves and channels for the quenching fluid. The lower part of the current loop is formed by two quarter-circle-shaped members 60, connected to the feeders 62 for the current. These two feeders and also the members 60 are held compressed together by means of isolated bolts 67 and are insulated from each other by means of an insulating spacer 68. The members 60 are surrounded by channels 61, which through channels 69 communicate with a valve box 70 and 70¹ for the quenching-fluid valves to which pipe nipples 71 are connected. The upper member of the current loop consists of a semicircle-shaped part 72, so made as to precisely fit to the lower members 60. The member 72 is surrounded by a fluid channel 73, which communicates through channels 74 with connecting studs 75 for the valve box 70, in which there are valve disks 76 normally held pressed upwardly towards packings 77 but the valve spindle 78 for these valves projects upwardly through the upper part of the valve box 70 and is operated upon the lowering of the upper part by an insulating pin 79, fixed within the stud 75 the latter is edge-shaped at its lower end and adapted to tighten against packing glands 80. The upper part of the current loop is fixed by means of bolts 81 to a flange 82 on an operating rod 83 extending downwardly from the operating means. The means functions in such a manner that as the upper part is lowered against the lower part, the pin 79 will depress the valve spindle 78 so that the valve disk 76 leaves the packing 77, thereby enabling the quenching fluid such as water to flow from the feeders 71 upwardly through the channels 69 and 74 into the channels 61 and 73 and thence through the holes 63 out against the work piece. The closing of the current loops and the closing and opening of the valves for supplying the quenching fluid are controlled by devices mounted in the holder and which devices operate control circuits, so that such operations occur in the current sequence and for the desired durations.

In order to prevent direct contact between the work piece and the current loop in the case that the work piece under the influence of the heating should alter its shape, the current loop at its inside is provided with lists or projections 64 (Figs. 6 and 7) made of heat-resisting material such as quartz. These lists or projections either may be solid and arranged between the holes within the wall of the current loop or perforated as shown in Fig. 5 in order to prevent insufficient spraying by the quenching fluid. These projections are, of course, not intended to contact the work piece under normal conditions. If they do, however, under the above-mentioned abnormal conditions, their engagement with the work piece will not be so intimate as to prevent the quenching fluid from discharging upon the work piece surface. It is evident that in the case no quenching is needed, no holes are required within the wall of the current loop but it will be sufficient to provide the current loop on its inside with insulating lists or projections 64, as shown in Fig. 7.

Owing to the fact that the valve spindle 78 is operated by an isolating pin 79 and that the connecting studs 75 engage an insulating packing, as shown in Fig. 5 the current is prevented from flowing through the valve box so that the field generated by the current flowing through the loop will not be influenced injuriously.

We claim as our invention:

1. Apparatus for the surface hardening or other heat treatment of a plurality of parts of at least two different shapes on a longitudinally extending work piece by successive local heatings by electric high-frequency current, comprising a plurality of substantially stationary two-part inductors each with a different inner configuration conforming to the shape of a different part of the work piece to be treated, a work piece support, means for mounting the workpiece for rotation about its longitudinal axis in said support, means for mounting the said support for movement with the workpiece in a direction longitudinally of said workpiece and with respect to said inductors to successively bring different parts of the workpiece into alignment with the different inductors, a pattern member carried by said support and serving to bring about said alignment, and relatively stationary means coacting with said pattern member to supply heating current when a predetermined part of the work piece is aligned with a predetermined inductor.

2. Apparatus according to claim 1 in which each inductor comprises a current loop divided into two parts within a substantially horizontal plane, one loop part being stationary and insulatingly connected to current feeders, an operating device whereby the other loop part is raised and lowered to open and close the inductor, each current loop being provided with valves in its lower part, control devices adapted to open said valves when the upper part of the loop is pressed against the lower part, thus provided free access for a quenching liquid through the upper and lower parts of the loop, and perforations in the loop for the passage of said liquid to the part being treated.

3. Apparatus according to claim 1, in which each inductor consisting of upper and lower parts, an operating device for raising and lowering the upper part of each inductor, valve means for the supply of quenching liquid to the inductors, and an insulated valve device controlling the passage of the quenching liquid between the parts of each inductor without providing a short-circuit path between said parts.

4. Apparatus according to claim 1, in which each inductor is divided into upper and lower parts and each lower part is divided into two parts insulated from each other, and comprising passages for the flow of quenching liquid through said upper and lower parts, valve means for the passage of said liquid from the lower parts to the upper part and liquid packing means between said upper and lower parts.

5. Apparatus according to claim 1, comprising heat resisting insulating projections on the inner faces of the inductors, perforations in said projections for the discharge of quenching liquid against the work piece, and passages for the supply of quenching liquid through the parts of the inductor to said perforations.

6. Apparatus according to claim 1, in which the inductors are spaced from each other in a direction longitudinally of the axis of the work piece without respect to longitudinal distances between the parts of the work piece to be treated by said inductors, means for opening and closing the inductors and means for supplying heating current to each inductor when said support has been moved to a predetermined longitudinal position, when the work piece has been turned to a predetermined angular position and when the corresponding inductor has been closed upon the part of the work piece to be treated.

7. Apparatus according to claim 1, comprising fluid pressure means for opening and closing each inductor, and means for supplying heating current to the closed inductor when the work piece is in a predetermined longitudinal and angular position and when the fluid pressure holding the inductor in the closed position reaches a predetermined value.

LENNART HÖGEL.
THOR THELEMARCK.
CARL LINDBERG.

REFERENCES CITED

The following references are of record in the file of this patent:

UNITED STATES PATENTS

| Number | Name | Date |
|---|---|---|
| 1,708,512 | MacDonald et al. | Apr. 9, 1929 |
| 2,202,759 | Denneen et al. | May 28, 1940 |
| 2,255,103 | Denneen et al. | Sept. 9, 1941 |
| 2,264,301 | Denneen et al. | Dec. 2, 1941 |
| 2,312,597 | Somes | Mar. 2, 1943 |
| 2,326,206 | Dunn et al. | Aug. 10, 1943 |
| 2,349,813 | Denneen et al. | May 30, 1944 |
| 2,368,809 | Denneen et al. | Feb. 6, 1945 |
| 2,398,085 | Denneen et al. | Apr. 9, 1946 |
| 2,511,059 | Haynes | June 13, 1950 |